United States Patent
Wang

(10) Patent No.: US 6,971,751 B2
(45) Date of Patent: Dec. 6, 2005

(54) PROJECTING DEVICE WITH ADJUSTABLE COLOR TEMPERATURE

(75) Inventor: Sze-Ke Wang, Miao-Li (TW)

(73) Assignee: Coretronic Corporation, Miao-Li (TW)

(*) Notice: Subject to any disclaimer, the term of this patent is extended or adjusted under 35 U.S.C. 154(b) by 0 days.

(21) Appl. No.: 10/708,603

(22) Filed: Mar. 14, 2004

(65) Prior Publication Data
US 2004/0201828 A1 Oct. 14, 2004

(30) Foreign Application Priority Data
Apr. 9, 2003 (TW) .............................. 92205806 U

(51) Int. Cl.⁷ .................... G03B 21/14; G03B 21/00; G02B 5/22
(52) U.S. Cl. .................... 353/84; 353/31; 359/889; 359/891
(58) Field of Search ............................. 353/28, 31, 84; 348/759, 761; 359/887–892; 349/78–81, 349/104–106, 108

(56) References Cited

U.S. PATENT DOCUMENTS

| | | | | |
|---|---|---|---|---|
| 5,650,832 A | * | 7/1997 | Poradish et al. | 348/743 |
| 5,839,807 A | * | 11/1998 | Perlo | 353/38 |
| 6,830,343 B2 | * | 12/2004 | Song | 353/84 |
| 2003/0142241 A1 | * | 7/2003 | Allen et al. | 348/742 |
| 2003/0227577 A1 | * | 12/2003 | Allen et al. | 348/742 |
| 2005/0063082 A1 | * | 3/2005 | Davis | 359/889 |

* cited by examiner

Primary Examiner—Alan A. Mathews
Assistant Examiner—Andrew Sever
(74) Attorney, Agent, or Firm—Winston Hsu

(57) ABSTRACT

An adjustable color-temperature projecting device includes a light source for providing light beams, and a filtering means. The filtering means includes red, green and blue filtering sections. The blue filtering section has coatings with different transmissivitys. The intensity of blue primary color light is varied due to the different transmissivitys of the blue filtering section, so that the ratio of blue primary color light in the hybrid light is modified to cause change in color temperature with reduced loss of brightness. Then, the filtering means is moved so that the light beam is projected onto a predetermined location to obtain the desired color temperature.

8 Claims, 7 Drawing Sheets

PROJECTING DEVICE WITH ADJUSTABLE COLOR TEMPERATURE

BACKGROUND OF INVENTION

1. Field of the Invention

The invention relates to a projecting device, and more particularly to an adjustable color-temperature projecting device.

2. Description of the Prior Art

Color temperature brings different visual impressions. For example, a color of low color temperature gives warm feeling, while a color of high color temperature gives cool feeling. Therefore, the color temperature of a projecting device can be adjusted to satisfy the consumer's demands or visual requirement for different occasions such as presentation in conferences or movie shows.

Referring to FIG. 1, a conventional projecting device 10 includes a light source 11, a color wheel 12, an integrated rod 13, a light valve 14 and a projection lens 15. The color wheel 12 includes red, green and blue color light filters, or alternatively red, green, blue and white color light filters arranged in circle. After a light beam emitting from the light source 11 travels through the color wheel 12, red, green and blue color lights are subsequently generated and then subjected to uniformization via the integrated rod 13. Thereafter, the color lights are projected on the light valve 14. Under control of digital signals from the light valve 14, the continuous color lights are converted into gray scales to form an image on a screen 16 via the projection lens 15. In order to adjust the color temperature, a filtering sheet 17 is further mounted in front of the projection lens 15. On the filtering sheet 17 is applied a coating which removes the color lights of a certain wavelength range. The filtering sheet 17 may be mutually rotated to attach on or dispatch from the projection lens 15 for change in color temperature. When the filtering sheet 17 is attached on the projection lens 15, color lights from the respective filters of the color wheel 12 are processed by the optical valve 14, then projected on the projection lens 15, and pass through the filtering sheet 17. The filtering sheet 17 removes a part of the color light of a certain wavelength range to alter the spectrum distribution of the red, green and blue color lights, and thus to cause change in color temperature. Thereby, the image is displayed on the screen 16. Since all the color lights pass through the filtering sheet 17 for a further filtering process, a part of the color lights from the red, green and white filters are removed, which results in reduced brightness.

SUMMARY OF INVENTION

One object of the invention is to provide a projecting device with adjustable color temperature, in which the color temperature is adjusted by controlling the light beam passing through a coating with different predetermined transmissivities on a blue filtering section.

Another object of the invention is to provide a projecting device with adjustable color temperature, in which only the transmittance of the blue filtering section is changeable to reduce adverse effect on the brightness of the projecting device.

In order to achieve the above and other objectives, the projecting device of the invention includes a light source for providing alight beam, and a filtering means. The filtering means includes red, green and blue filtering sections. The blue filtering section has coatings of different transmittances. The intensity of blue primary color light is varied due to the different transmissivities of the blue filtering section, so that the ratio of blue primary color light in a hybrid light is modified to cause change in color temperature with a reduced loss of brightness. Then, the filtering means is moved so that the light beam is projected at a predetermined location to obtain the desired color temperature.

BRIEF DESCRIPTION OF DRAWINGS

The drawings included herein provide a further understanding of the invention. A brief introduction of the drawings is as follows.

DETAILED DESCRIPTION

To provide a further understanding of the invention, the following detailed description illustrates embodiments and examples of the invention, this detailed description being provided only for illustration of the invention.

Figure 1:
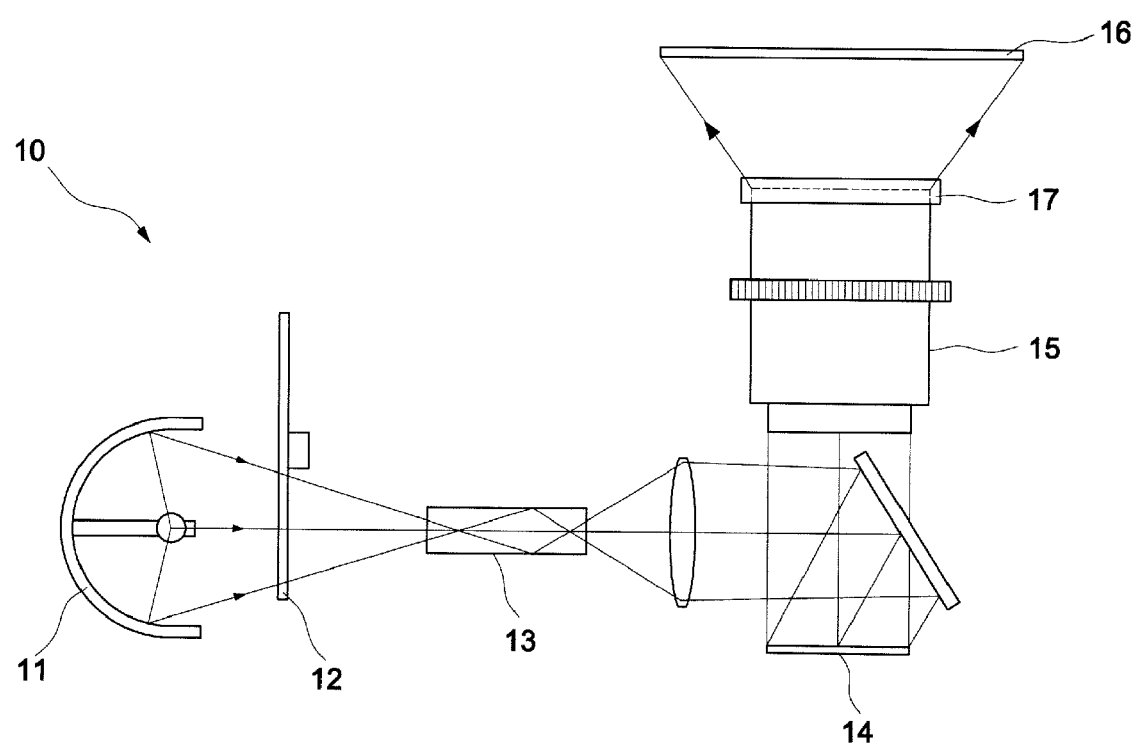
FIG. 1 is a schematic view of a conventional projecting device.
Figure 2:
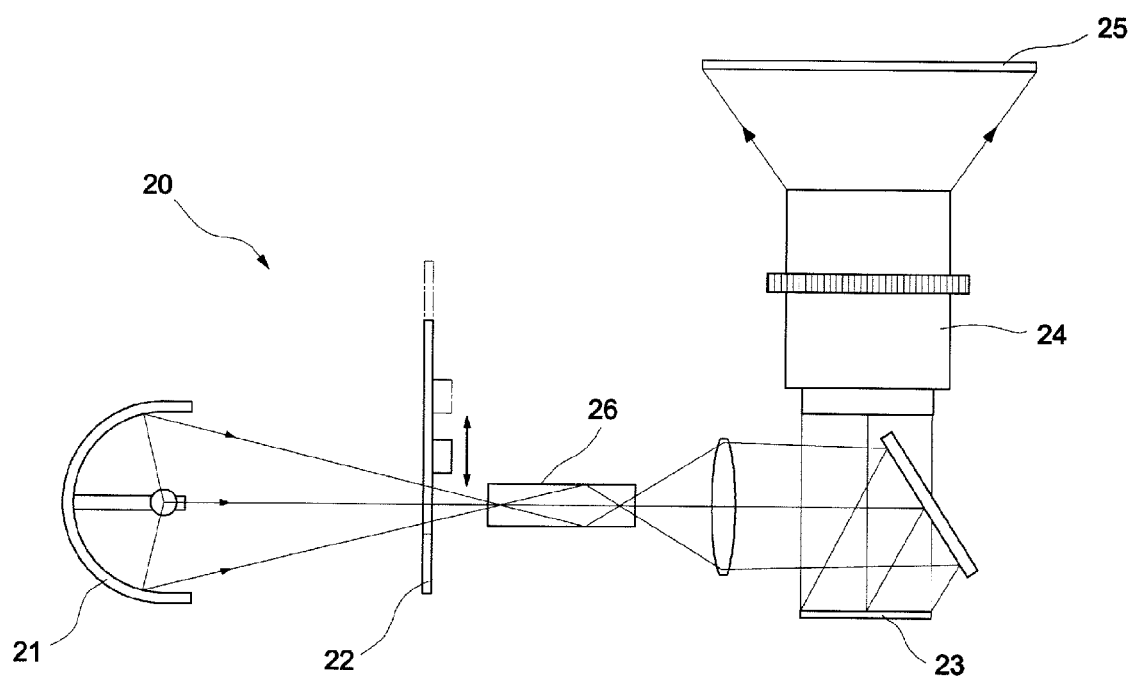
FIG. 2 is a schematic view of a projecting device with adjustable color temperature according to one embodiment of the invention.

Referring to FIG. 2, a projecting device 20 with adjustable color temperature according to the invention includes a light source 21, a filtering means 22, a light valve 23 and a projection lens 24. The light source 21 generates a light beam which passes through the filtering means 22 to subsequently generate primary color lights of red (R), green (G) and blue (B) colors. The primary color lights then are projected to the light valve 23. Under control of digital signals of the light valve 23, red, green and blue color lights are converted into gray scales and then projected on a screen 25 via the projection lens 24.

Figure 3:
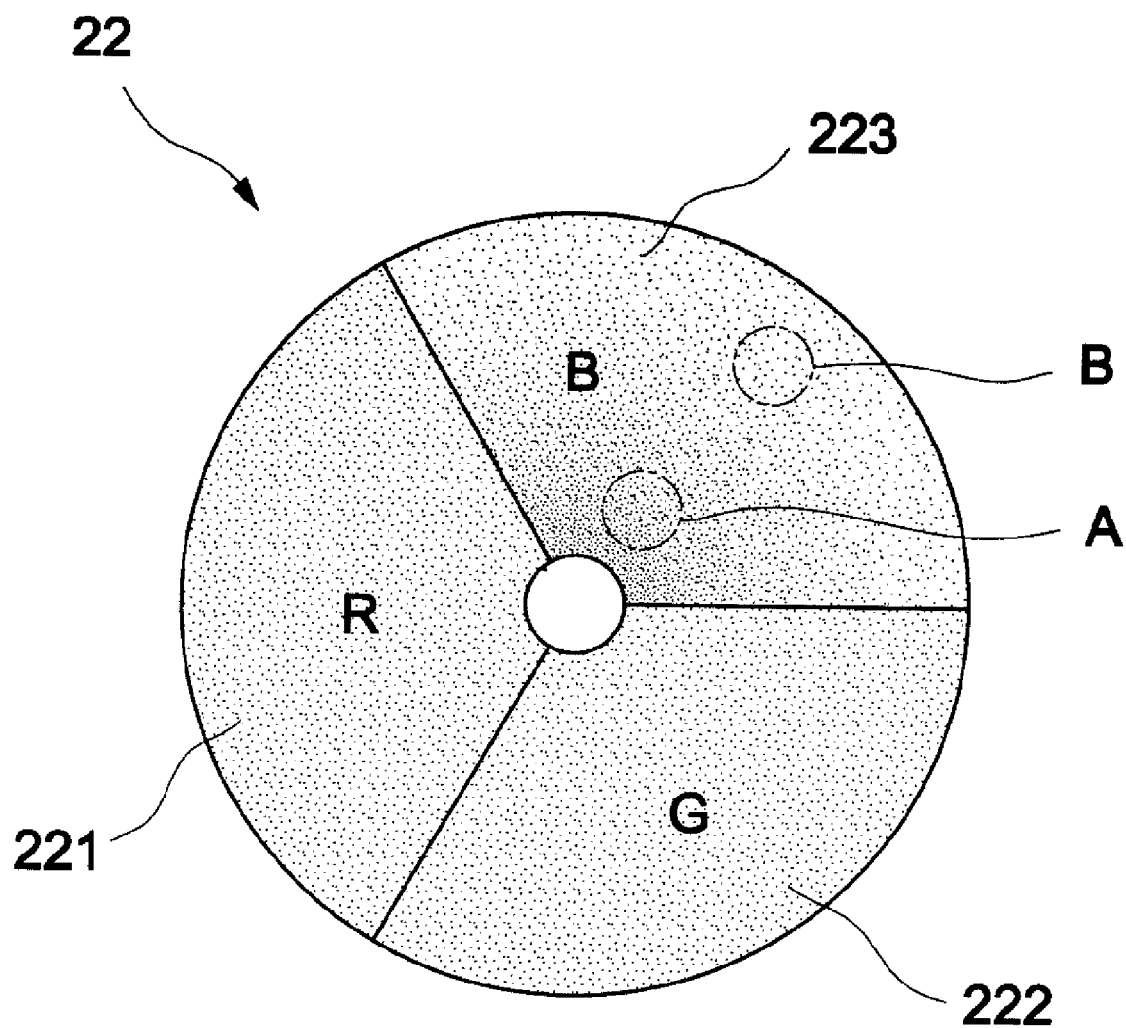
FIG. 3 is a front view of a filtering means according to a first embodiment of the invention.
Figure 4:
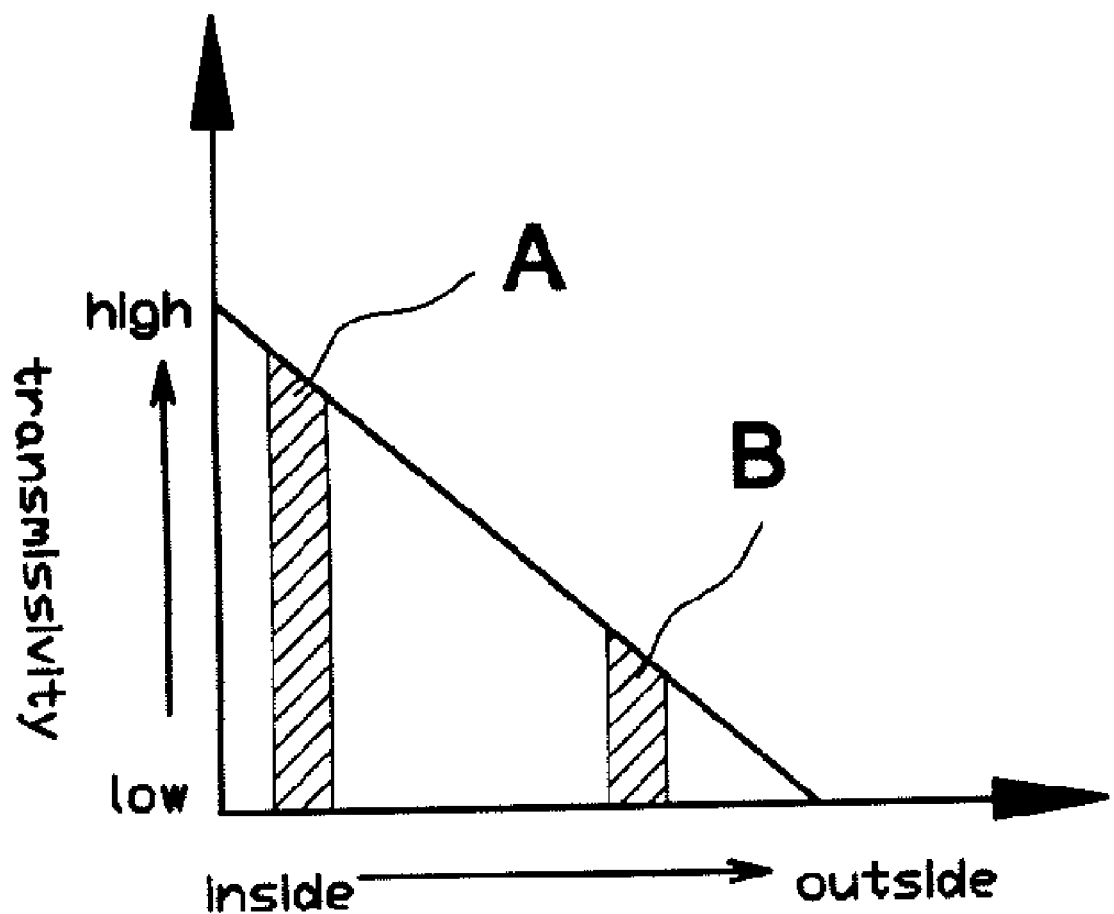
FIG. 4 is a graph illustrating the relationship between the transmissivity and the location of the blue filtering section according to one embodiment of the invention.

Referring to FIG. 3, the filtering means 22 has at least one red filtering section 221, one green filtering section 222 and one blue filtering section 223 to respectively separate red, green and blue color lights from the light beam. The red filtering section 221 and the green filtering section 222 respectively have constant transmissivity. The blue filtering section 223 has gradually changing transmissivities. Referring to FIG. 4, the transmissivity decreases from the inside to the outside. Furthermore, the filtering means 22 is a color wheel connected to a moving device (not shown) to allow linear movement of the filtering means 22. The filtering means 22 is moved to a predetermined location by means of the moving device to change the location where the light beam passes through the blue filtering section 223, thereby changing the transmissivity and the intensity of blue primary color light through the blue filtering section 223 to achieve change in color temperature. For example, when the light beam passes through part A of the blue filtering section 223 with high transmissivity, a blue primary light with high intensity is generated. The blue primary color light is mixed with red and green primary lights that respectively come from the red and green filtering sections 221, 222 and have constant intensities so as to obtain a hybrid light of high color temperature, i.e. cool hybrid light. When the light beam passes through part B of the blue filtering section with low transmissivity, a blue primary light of low intensity is generated. The blue primary color light is mixed with the red and green primary color lights, respectively coming from the red and green filtering sections 221, 222 and having constant intensities, to obtain a hybrid light of low color temperature, i.e. warm hybrid light.

Figure 5:
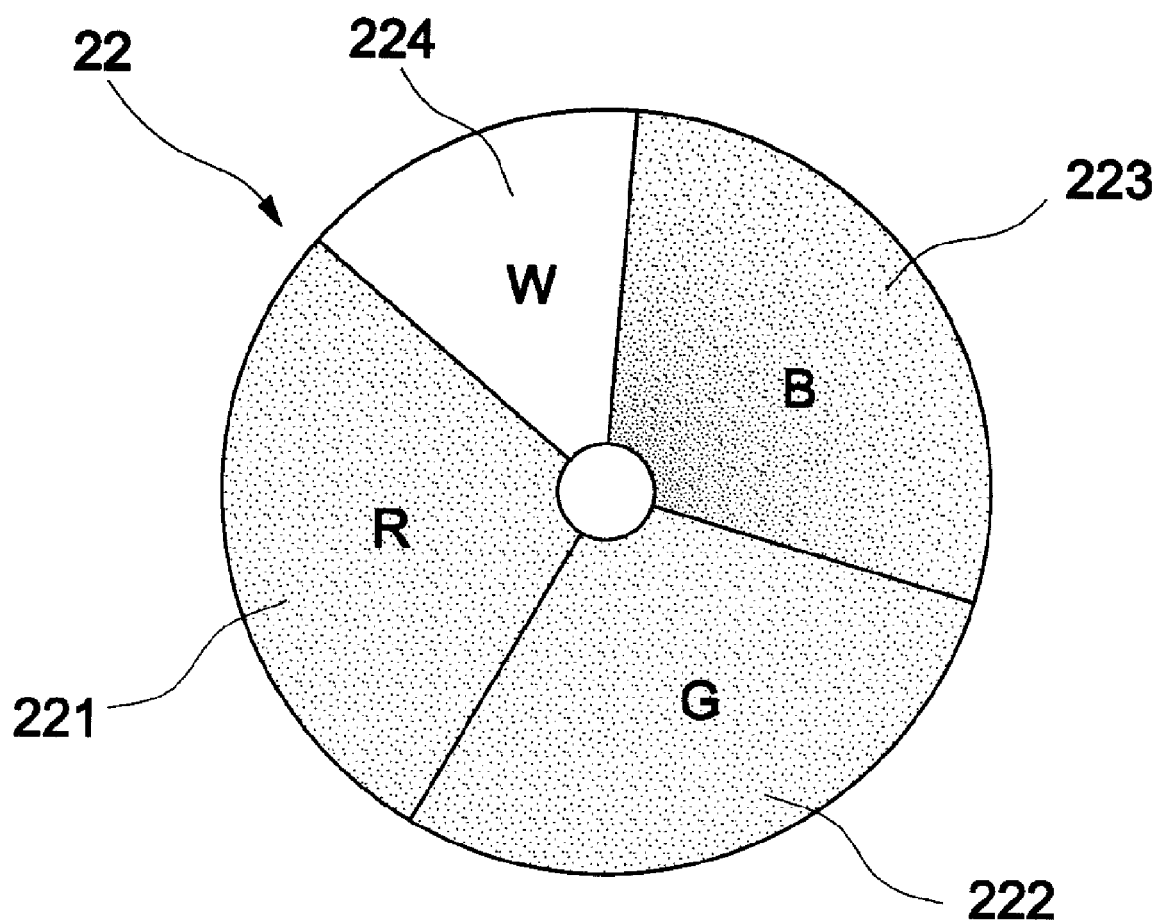
FIG. 5 is a front view of a filtering means having a white filtering section according to one embodiment of the invention.

The transmissivitys vary according to different locations of the blue filtering section 223. The filtering means 22 is moved by the moving device to change the location where the light beam is projected on the filtering means 22 to generate blue primary light of different intensities. Blue color light of different intensities is mixed with red and green color lights respectively having constant transmissivity to achieve adjustment of the color temperature. Referring to FIG. 5, the filtering means 22 further has a white filtering section 224 to increase the brightness, while the transmissivity of other color light filtering sections is kept constant. When the location where the light beam is projected on the filtering means 22 is changed, the intensity of the colored light passing through the white filtering section 224 is not affected, thereby achieving the adjustment of color temperature with reduced loss of brightness.

Furthermore, each part of the red and green filtering sections 221, 222 has constant transmissivity. Therefore, when the moving device changes the location where the light beam is projected on the filtering means 22, only the intensity of blue primary blue primary light is changeable, while the transmissivity of other color lights such as green primary light and red primary light remains unchanged. Therefore, the loss of brightness is reduced.

Figure 6:
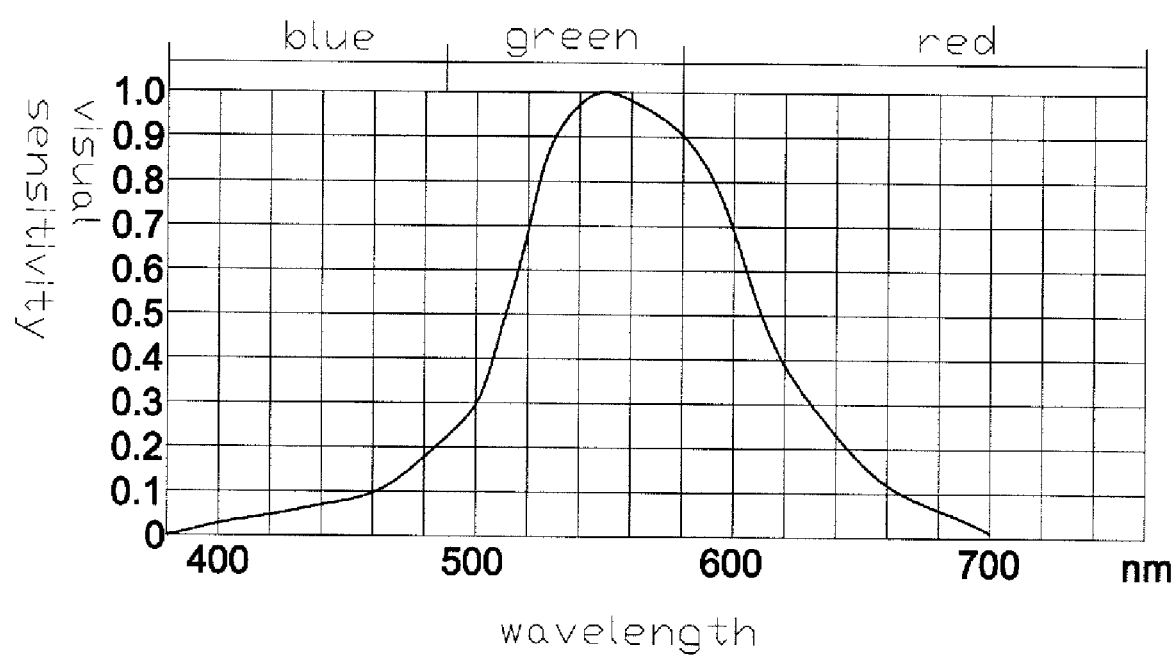
FIG. 6 is a graph illustrating the relationship between the wavelength and visual sensitivity.

The brightness of color light is the product of irradiancy with visual sensitivity. FIG. 6 illustrates a relationship between the wavelength and the visual sensitivity. Referring to FIG. 6, blue light of wavelength of 380 nm–490 nm has a visual sensitivity lower than green and red lights. Among the different color lights, blue light has minimal influence on the brightness. Therefore, changing the sensitivity of blue primary color light for adjusting the color temperature is achieved with a reduced loss of brightness. In other words, the change in color temperature rarely affects the brightness of an illuminating device.

Since the transmissivity gradually changes across the blue filtering section 223, non-uniform color lights therefore are generated all over the blue filtering section 223. In order to render the color lights uniform, an uniformization element 26 such as an integrated rod is further mounted at a rear end of the filtering means 22 to project a uniform light on the light valve 23.

Figure 7:
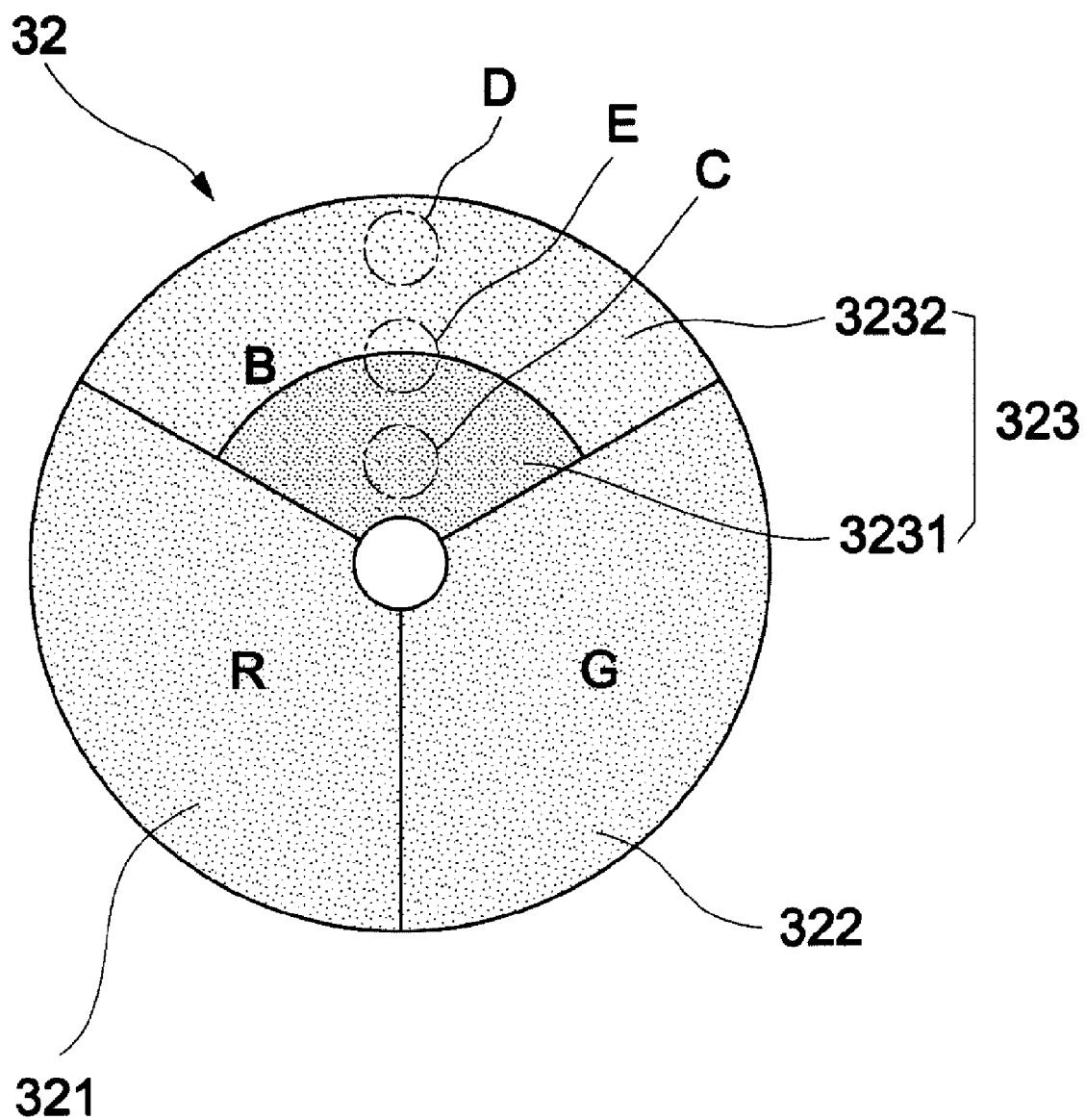
FIG. 7 is a front view of a filtering means according to a second embodiment of the invention.

Referring to FIG. 7, a filtering means 32 in another embodiment of the invention includes at least one red filtering section 321, one green filtering section 322 and one blue filtering section 323 to separate red, green and blue primary color lights from the light beam. The red filtering section 321 and the green filtering section 322 are coatings respectively with constant transmissivitys. The blue filtering section 323 is divided into a plurality of regions 3231, 3232 each of which has coatings with different transmissivities. The region 3231 has a transmissivity higher than the region 3232. The filtering means 32 is further connected to a moving device (not shown) to drive the filtering means 32 to linearly move along the regions 3231, 3232.

The moving device enables to change the location where the light beam passes through the blue filtering section 323 to modify the transmissivity, so that the intensity of blue primary color light is changed and the color temperature of the hybrid light is changed. When the light beam passes through the high-transmissivity region 3231 of the blue filtering section 323, as indicated by C in FIG. 7, high-intensity blue primary color light is generated. Blue primary color light then is mixed with red and green primary color lights, respectively coming from the red and green filtering sections 321, 322 and having constant intensities, to generate a hybrid light of high color temperature TH. When the light beam passes through the low-transmissivity region 3232 of the blue filtering section 323, as indicated by D in FIG. 7, low-intensity blue primary color light is generated. The obtained blue light then is mixed with red and green primary color lights, respectively coming from the red and green filtering sections 321, 322 and having constant intensities, to generate a hybrid light of low color temperature TL. When the light beam passes between the high-transmissivity region 3231 and the low-transmissivity region 3132, as indicated by E in FIG. 7, a hybrid light of color temperature ranging form TH to TL is generated according to the transmission of the light beam between the high-transmissivity region 3231 and the low-transmissivity region 3132.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An adjustable color-temperature projecting device, comprising:
   a light source, generating a light beam; and
   a filtering means, having at least one red filtering section, a green filtering section and a blue filtering section, wherein the blue filtering section has coatings of different transmissivities arranged in a manner that the transmissivity gradually changes across the blue filtering section, and the color temperature of a hybrid light is changed by moving the filtering means to modify the location where the light beam passes through the blue filtering section.

2. The projecting device of claim 1, wherein the blue filtering section is divided into a plurality of regions on each of which is applied a coating of different transmissivity.

3. The projecting device of claim 2, wherein the light beam is projected on a single region.

4. The projecting device of claim 2, wherein the light beam is projected between two regions.

5. The projecting device of claim 1, wherein the filtering means further includes a white filtering section.

6. The projecting device of claim 1, wherein the filtering means is a color wheel.

7. The projecting device of claim 1, wherein an uniformization element is further mounted at a rear end of the filtering means.

8. An adjustable color-temperature projecting device, comprising:
   a light source, generating a light beam; and
   a filtering means, having at least one red filtering section, a green filtering section and a blue filtering section, wherein a filtering section has coatings of different transmissivities arranged in a manner that the transmissivity gradually changes across the filtering section, and the color temperature of a hybrid light is changed by moving the filtering means to modify the location where the light beam passes through the filtering section.

* * * * *